No. 748,844. PATENTED JAN. 5, 1904.
L. H. COLBURN.
SLOTTING MACHINE.
APPLICATION FILED FEB. 13, 1902.
NO MODEL. 8 SHEETS—SHEET 2.

WITNESSES
E. J. Nottingham
G. F. Downing

INVENTOR
L. H. Colburn
By H. A. Seymour
Attorney

No. 748,844. PATENTED JAN. 5, 1904.
L. H. COLBURN.
SLOTTING MACHINE.
APPLICATION FILED FEB. 13, 1902.
NO MODEL. 8 SHEETS—SHEET 3.

WITNESSES
INVENTOR
L. H. Colburn
By H. A. Seymour
Attorney

No. 748,844. PATENTED JAN. 5, 1904.
L. H. COLBURN.
SLOTTING MACHINE.
APPLICATION FILED FEB. 13, 1902.
NO MODEL. 8 SHEETS—SHEET 4.

No. 748,844. PATENTED JAN. 5, 1904.
L. H. COLBURN.
SLOTTING MACHINE.
APPLICATION FILED FEB. 13, 1902.
NO MODEL. 8 SHEETS—SHEET 5.

No. 748,844. PATENTED JAN. 5, 1904.
L. H. COLBURN.
SLOTTING MACHINE.
APPLICATION FILED FEB. 13, 1902.
NO MODEL. 8 SHEETS—SHEET 6.

No. 748,844. Patented January 5, 1904.

UNITED STATES PATENT OFFICE.

LESLIE H. COLBURN, OF FRANKLIN, PENNSYLVANIA, ASSIGNOR OF ONE-HALF TO BAKER BROTHERS, OF TOLEDO, OHIO, A FIRM.

SLOTTING-MACHINE.

SPECIFICATION forming part of Letters Patent No. 748,844, dated January 5, 1904.

Application filed February 13, 1902. Serial No. 93,883. (No model.)

*To all whom it may concern:*

Be it known that I, LESLIE H. COLBURN, of Franklin, in the county of Venango and State of Pennsylvania, have invented certain new and useful Improvements in Slotting-Machines; and I do hereby declare the following to be a full, clear, and exact description of the invention, such as will enable others skilled in the art to which it appertains to make and use the same.

My invention relates to an improvement in slotting-machines designed for a great variety of work, but more particularly for the internal slotting of connecting rods and straps, locomotive driving-boxes and cross-heads, and for key-seating and other work of like character where a long slender tool is required in order to reach the work, the principal objects of this invention being to provide means for regulating the stroke of the cutter-bar and to give an automatic relief movement to the table to prevent dragging of the cutter on the return stroke; and with these ends in view my invention consists in the parts and combinations of parts, as will be more fully explained, and pointed out in the claims.

In the accompanying drawings, Fig. 2 is a front view, Fig. 8 is a view in section of the front end of the table-feed screw and mechanism thereon. Fig. 12 is a view in elevation of the shaft and gearing which actuate the feeds of the several tables. Fig. 13 is a sectional view of same; and Fig. 13$^a$ is a view in elevation of the gear-wheel H$^4$, showing the ratchet-teeth therein; and Fig. 13$^b$, a view of the pawl. Fig. 14 is a view in plan, partly in section, and Fig. 15, a view in end elevation, of the reversing mechanism. Fig. 18 is an end view of the split nut K'.

A base or standard $b$ carries the column Q$^2$, on which is mounted the arm Q, these three parts constituting the frame of the machine.

Figures 6, 7:
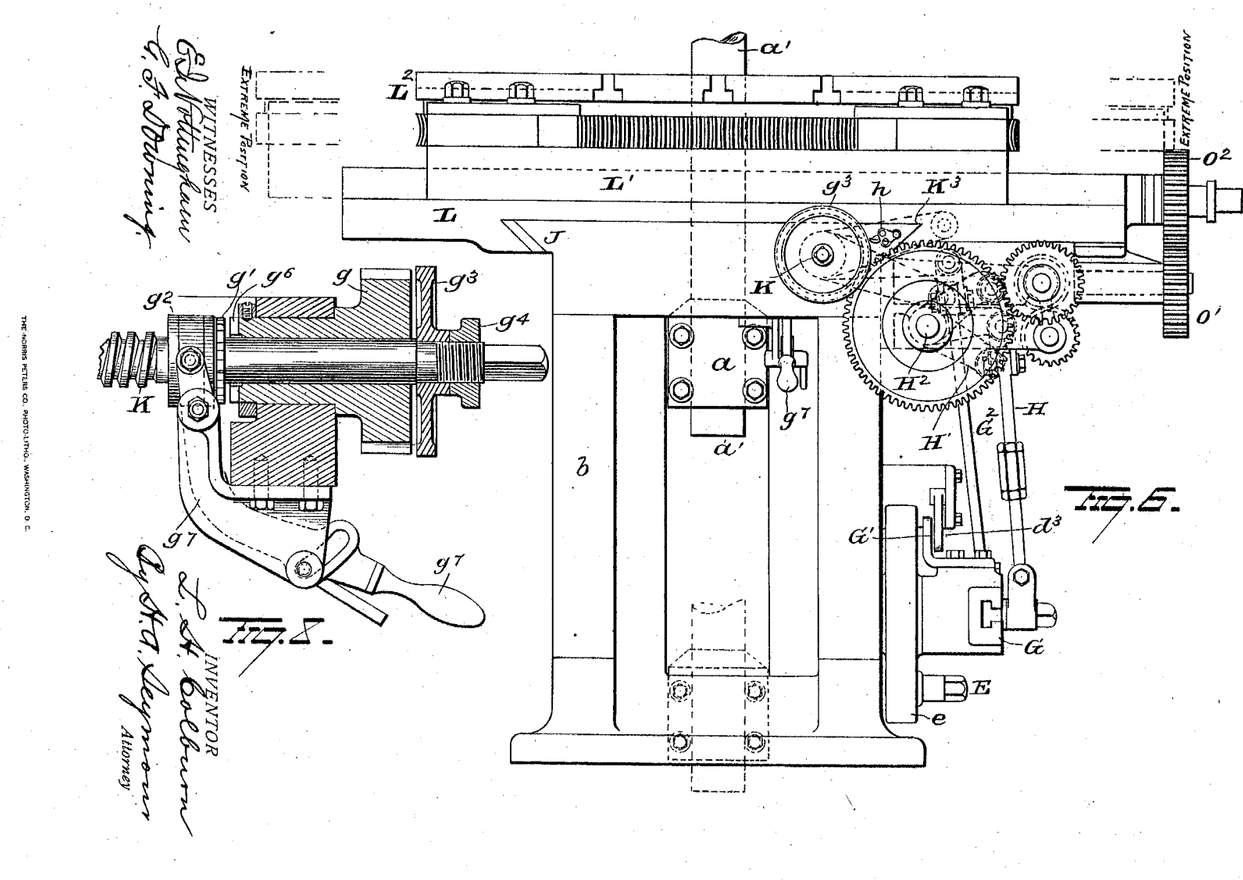
Fig. 6 is an enlarged view, in end elevation, of the main frame and parts below the table carried thereby.
Fig. 7 is a view in horizontal section through the driving mechanism of the machine with some parts removed.
Figure 7:
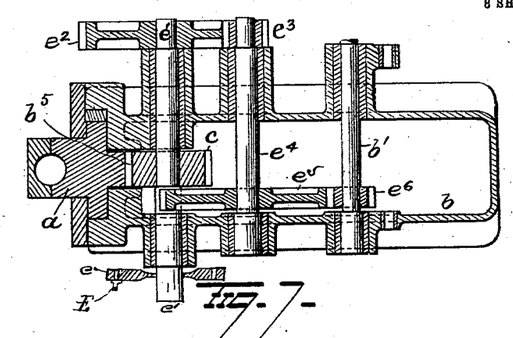
Figures 13, 13A, 13B, 14:
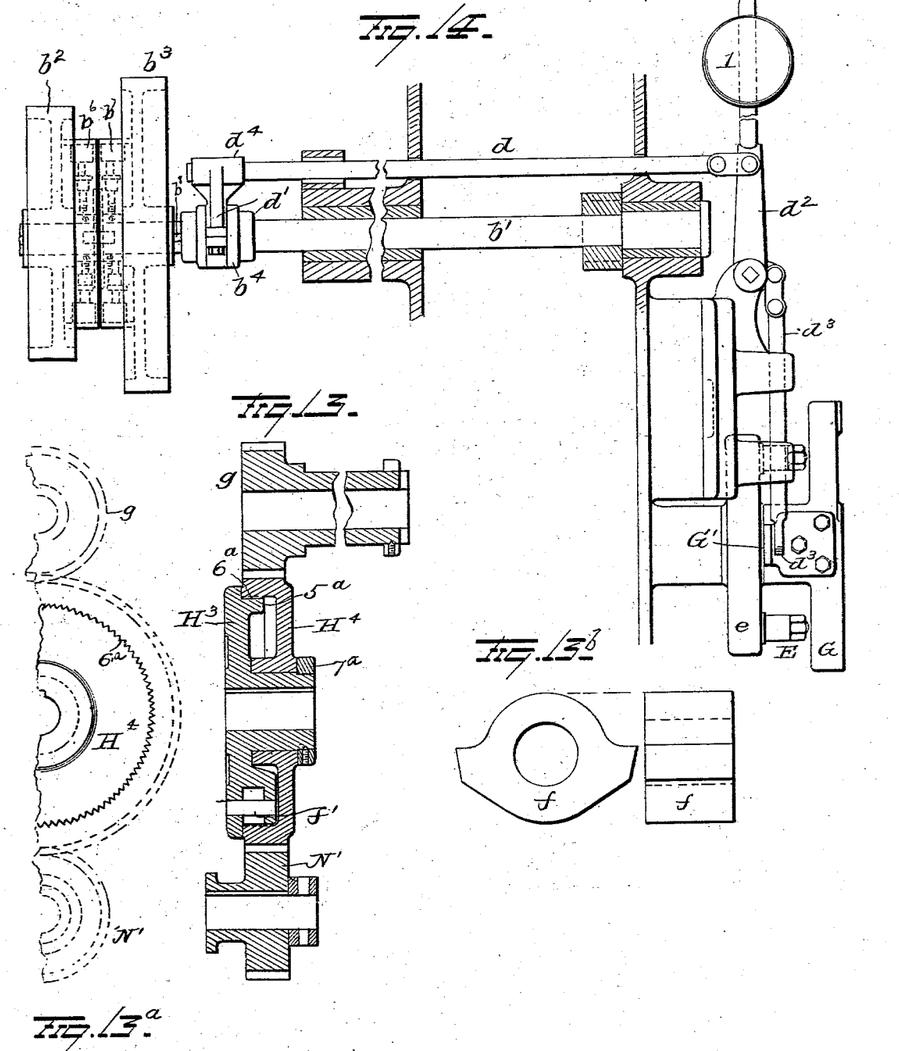
Figure 16:
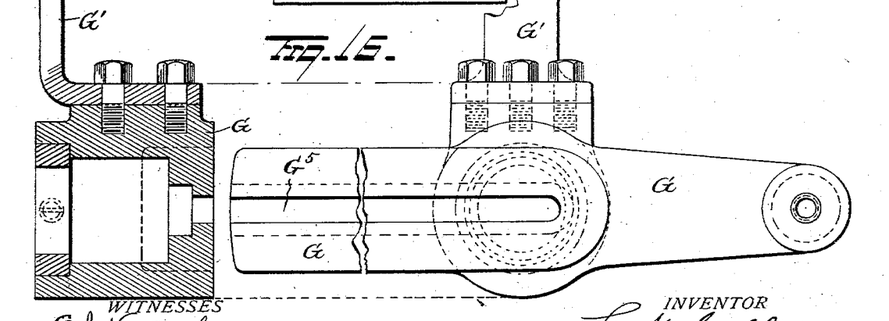
Fig. 16 is an enlarged view of the rocker-arm.
Figure 17:
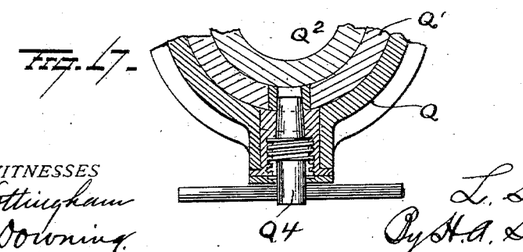
Fig. 17 is a view in section showing the mechanism for locking the arm Q against rotation.

The ram $a$ is located within the standard $b$ and is fitted to a suitable slideway or bearing, in which it moves, and is provided on its rear face with a rack $b^5$, which engages the pinion $c$, fast on shaft $e'$, as shown in Fig. 7. This shaft $e'$ carries the larger gear $e^2$, which meshes with pinion $e^3$ on shaft $e^4$, and the latter carries the larger gear $e^5$, meshing with pinion $e^6$ on shaft $b'$. The several shafts above referred to are mounted in the frame or standard $b$, and the shaft $b'$ projects through and beyond said frame or standard $b$ and carries the clutch-pulleys $b^2$ and $b^3$. It is of course evident that instead of using pulleys clutch-gearing may be employed. Hence I would have it understood that by the term "pulleys" I intend to include gearing or other mechanical devices for transmitting power from a motor to the machine. These clutch-pulleys may be of any approved construction, the pulley $b^3$ being used for imparting a downward movement to the ram $a$, while the pulley $b^2$ is for giving the ram a quick reverse upward movement. The clutches $b^6 b^7$ of these pulleys $b^2$ and $b^3$ are actuated by the shifting rod $d$. (Shown in Fig. 14.) This shifting rod is mounted in suitable bearings in the frame or standard $b$ and is provided at its rear end with the shipper-fork $d^4$, which latter engages a groove in the sliding collar $b^4$ on shaft $b'$. The collar $b^4$ has a sliding fit on shaft $b'$ and is connected by a rod $b^8$, mounted in a slot in shaft $b'$, with the clutch mechanism $b^6 b^7$, which locks the pulleys $b^2$ and $b^3$ to the shaft $b'$. The rod $d$ is connected by means of a link with the long arm of the bell-crank lever $d^2$, which latter is pivotally mounted on the front side of the frame, the short arm of said lever $d^2$ being connected by a link connection to the sliding rod $d^3$. The shifting rod $d$ is connected to bell-crank lever $d^2$ at a point between the ends of the long arm of the latter, and said long arm carries a weight $l$, which latter by its momentum assists in forcing the clutch tightly into contact with the pulleys $b^2$ and $b^3$.

From the construction thus far described it is apparent that a movement of the rod $d^3$ rearwardly will shift the rod $d$ toward pulleys $b^2$ and $b^3$, whereas a reverse movement of rod $d^3$ will cause a reverse movement of the rod $d$, thus first locking one pulley and then the other to shaft $b'$.

Secured to the front end of shaft $e'$, which latter, as before explained, carries pinion $c$, which actuates the ram $a$, is the stroke-regulating disk $e$. This disk is provided on its outer face with an annular T-shaped groove, in which are adjustably secured the tappets E and F. These tappets may be secured in any position within the groove and are designed to engage the bent end of rod $d^3$ and shift the latter longitudinally, and thus actuate the clutch on shaft $b'$. By setting the tappets in different positions on the disk $e$ the length of travel of the ram may be regulated.

Figure 1:
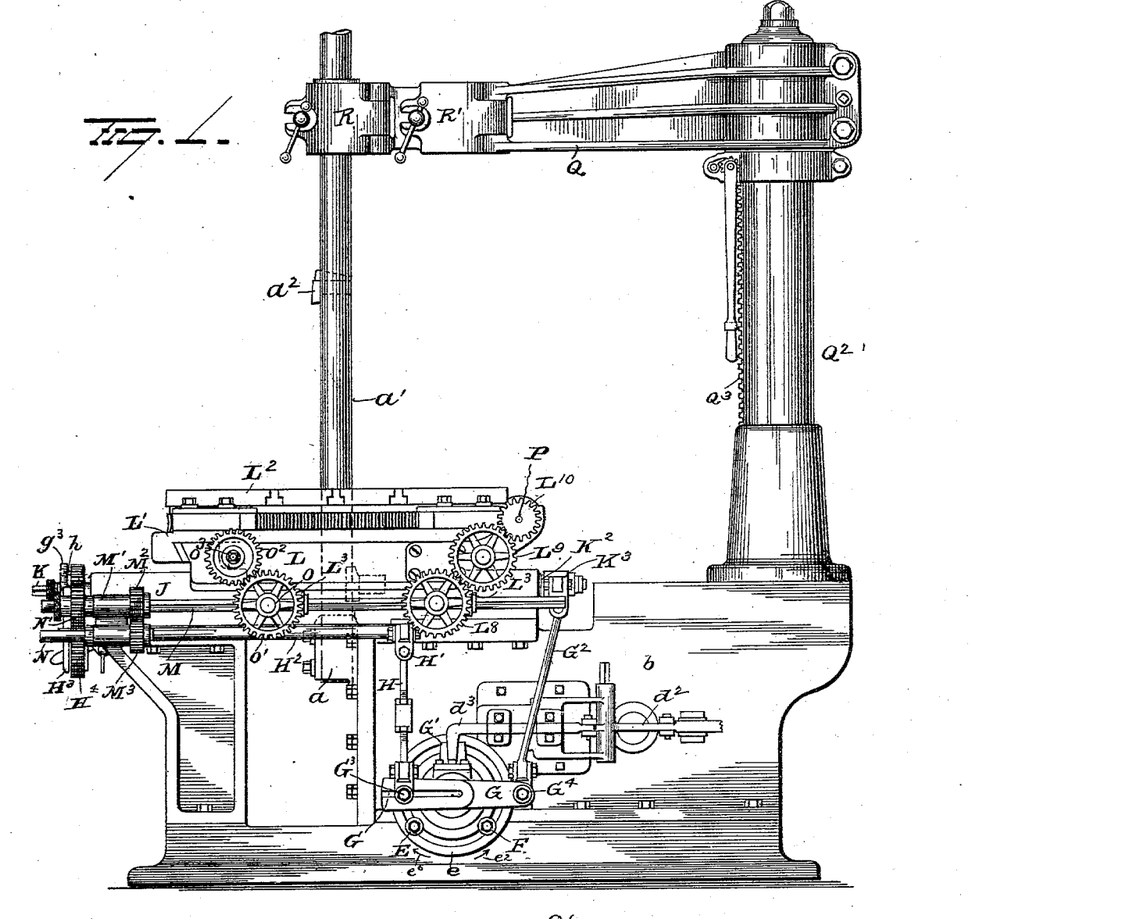
Figure 1 is a view in side elevation of my improved machine.
Figure 2:
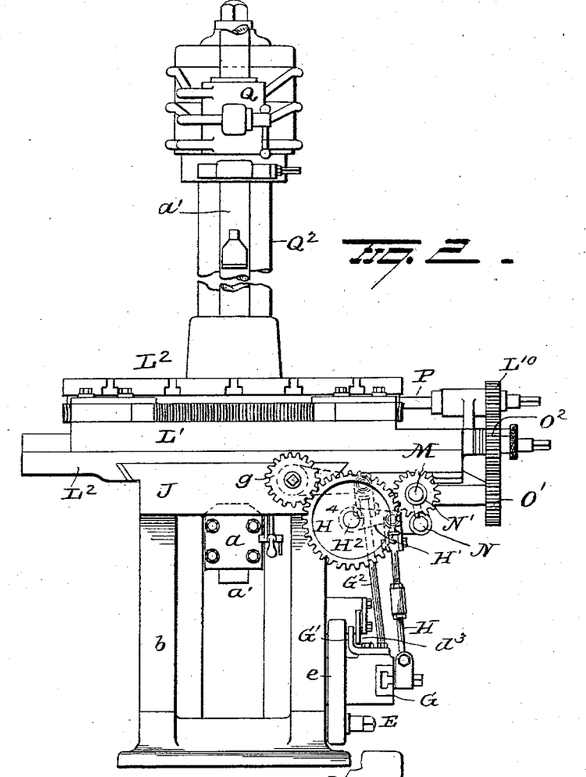

Mounted on shaft $e'$ in front of the disk $e$ is the rocker-arm G. This arm is fitted to rock freely on the shaft, and the hub thereof is provided on its upper side with a lug or extension G', which projects up and normally rests in the path traveled by the tappets E and F. This lug G' is wider than the bent end of rod $d^3$, as clearly shown in Fig. 1, so that it will be engaged first by the tappets and moved some distance before the machine is reversed by the engagement of the tappets with the bent end of rod $d^3$. These tappets and rocker-arm G are extremely important features of my invention, for by means of them I regulate the stroke of the cutter-bar, give automatic relief to the table, so that the cutter cannot drag on the return stroke, and actuate the mechanism operating all the table-feeds.

Attached to one end of rocker-arm G and adjustable toward and from the center of same is the connecting-rod H. This rod H is pivotally attached to an arm H', which is keyed rigidly to the horizontal shaft $H^2$, which is supported in bearings at or near its ends. Hence it will be seen that as the arm G is rocked by the tappets previously referred to the shaft $H^2$ is correspondingly rocked.

Figure 4:
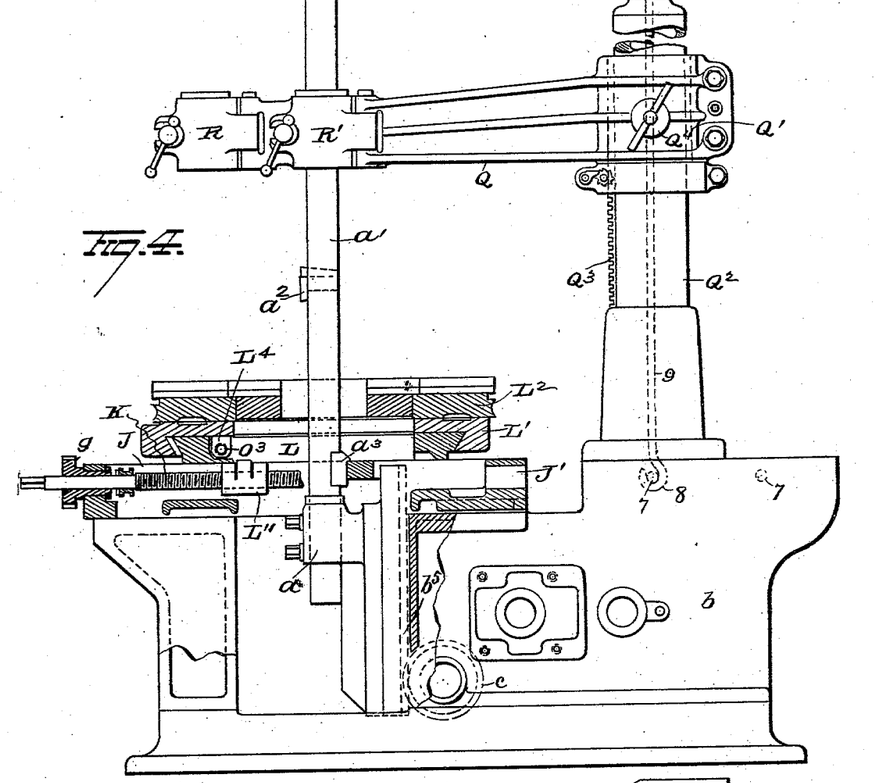
Fig. 4 is a view in side elevation, partly in section.
Figures 12, 13, 15:
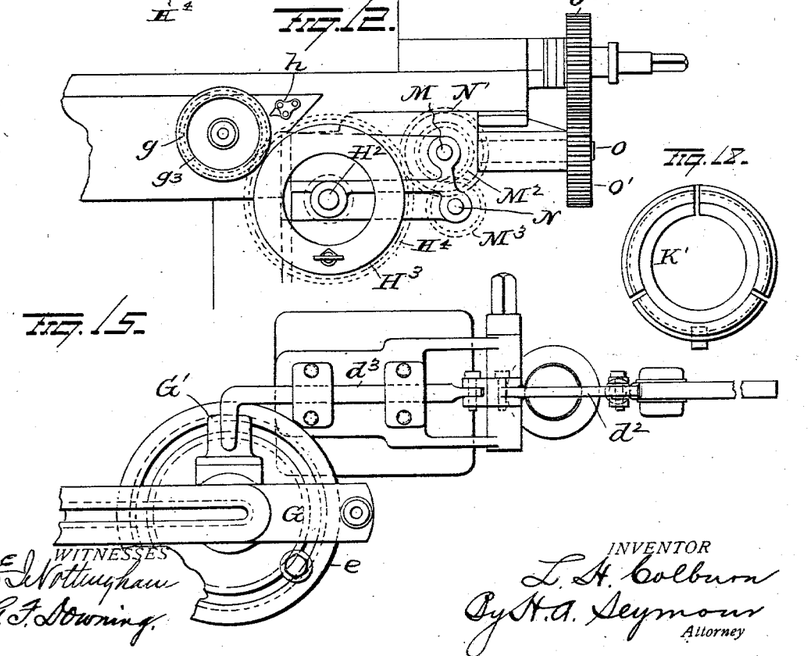

Shaft $H^2$ carries at its front end the disk-plate $H^3$, keyed thereto, and mounted on the hub of plate $H^3$ is the gear $H^4$. The outer face of the gear is recessed or cut away, as shown in Fig. 13, to receive the inwardly-projecting flange $5^a$ of the plate $H^3$, and is also provided with the internal ratchet-teeth $6^a$, (see Fig. 13,) which latter are engaged by the pawl $f$, carried on stud $f'$, mounted on the plate $H^3$. This pawl, as clearly shown in Fig. $13^b$, is provided with a tooth on each end, and being centrally mounted on the stud $f'$ it follows that by turning the pawl slightly one tooth is disengaged from the internal teeth of the gear $H^4$ and the other end engaged with said teeth, thus reversing the direction of rotation of gear-wheel $H^4$. This gear-wheel $H^4$ is revolubly mounted on the hub of disk $H^3$ and is retained thereon against displacement by the collar $7^a$. The disk-gear $H^4$ thus mounted meshes with a pinion $g$, fitted into a bearing in the front of the table-slide J, as clearly shown in Figs. 4 and 8. This gear $g$ is bored out to form a bearing for the feed-screw K and is provided on the inner end of its hub (see Fig. 8) with teeth $g^6$, which are designed to be engaged by the teeth $g'$ on the clutch-collar $g^2$. This collar is keyed to feed-screw K and is actuated or moved longitudinally on said screw by the lever $g^7$, which is pivoted to the frame of the machine and carries at its upper end an ordinary clutch-fork, the arms of which rest within the circumferential groove in the clutch-collar $g^2$. When this feed-screw is coupled up to the actuating mechanism above described by means of the clutch $g^2$, the table will be intermittently fed longitudinally through connections therewith to be hereinafter described, and by disengaging the clutch this longitudinal feed can be discontinued.

Secured to the outer end of feed-screw K is the micrometer-plate $g^3$, which latter is clamped against a shoulder on said shaft by the nut $g^4$. The rim of this micrometer-plate is so graduated that the exact longitudinal travel or feed of the table can be determined at a glance, the fixed pointer $h$ on the frame indicating the distance traveled. The extreme front end of the feed-screw K is made square to engage a socket-wrench when it becomes necessary or desirable to feed the table by hand.

The screw K passes through a nut $L^{11}$, secured to the under side of the table L. Hence when the feed-screw K is rotated in either direction the table L, which is mounted on the table-slide J, is correspondingly moved lengthwise the screw.

Figure 9:
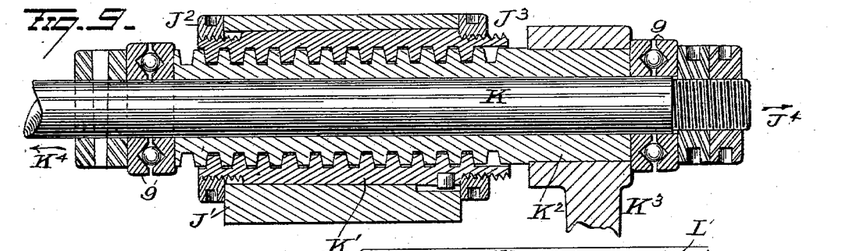
Fig. 9 is a view in section through the devices for moving the feed-screw longitudinally.
Figure 10:
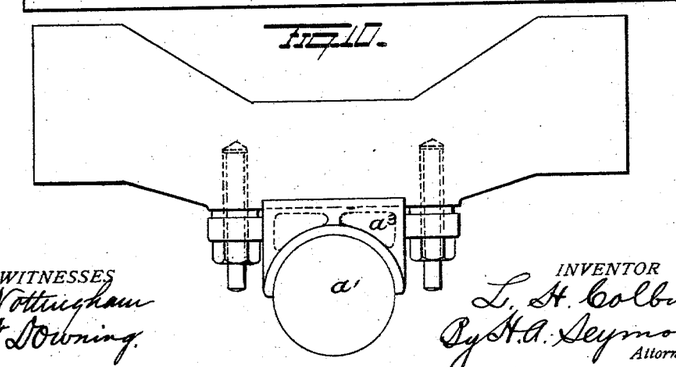
Fig. 10 is a view in elevation of the cutter-bar-supporting shoe.
Figure 11:
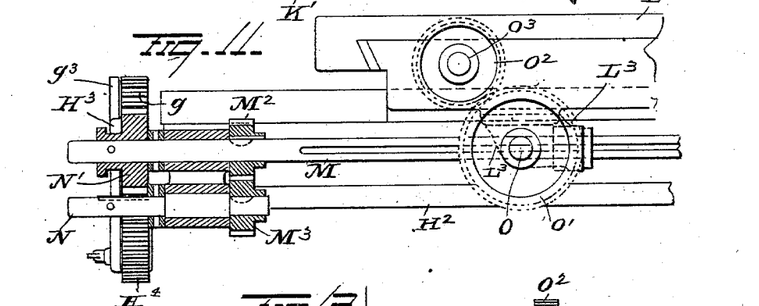
Fig. 11 is a view in section of the mechanism for reversing the direction of feed of the transverse and rotary tables.

The rear end of the table-slide J is provided with a tapering or conical bearing J' (see Figs. 4 and 9) to receive the brass nut K'. This nut is divided longitudinally into a series of sections, or, in other words, is a split nut, the sections of which may be adjusted to compensate for wear by moving said nut longitudinally in its conical bearing and can be secured when properly adjusted by the threaded collars $J^2$ and $J^3$, mounted on the externally-threaded ends thereof. These collars $J^2$ and $J^3$ are located at opposite ends of the bearing J' and are provided with peripheral recesses therein for the attachment of a spanner-wrench. This nut is provided internally with coarse threads, which are engaged by the externally-threaded sleeve $K^2$, loosely mounted on feed-screw K near the end of the latter, the portion of the screw K covered by the sleeve $K^2$ being plain and without threads. This sleeve $K^2$, which is carried by the table-slide J, forms a support or bearing for the rear end of the feed-screw K, and said sleeve is restrained against endwise movement on the screw K by the keys and nuts, as shown, ball-bearing thrust-collars 9 being introduced at each end to reduce the friction. To the rear projecting end of the sleeve $K^2$ is rigidly secured the lever $K^3$. From the foregoing explanation it is evident that any movement of the lever-arm $K^3$ will turn the screw-threaded sleeve $K^2$ within the nut K' and move the feed-screw K longitudinally, this longitudinal movement being independent of its rotating movement, and as the screw is connected to the feed-table L by the nut $L^{11}$ it follows that a longitudinal movement of the screw carries the table L and all parts thereon an equal distance. This movement of the table carrying the work away from the cutter is what I term the "automatic relief" for the cutter on the return stroke.

The lever $K^3$, which, as before explained, is secured on the sleeve $K^2$, is connected at its free end to the rocker-arm G through the medium of the rod $G^2$ and two links, one at each end.

Figure 5:
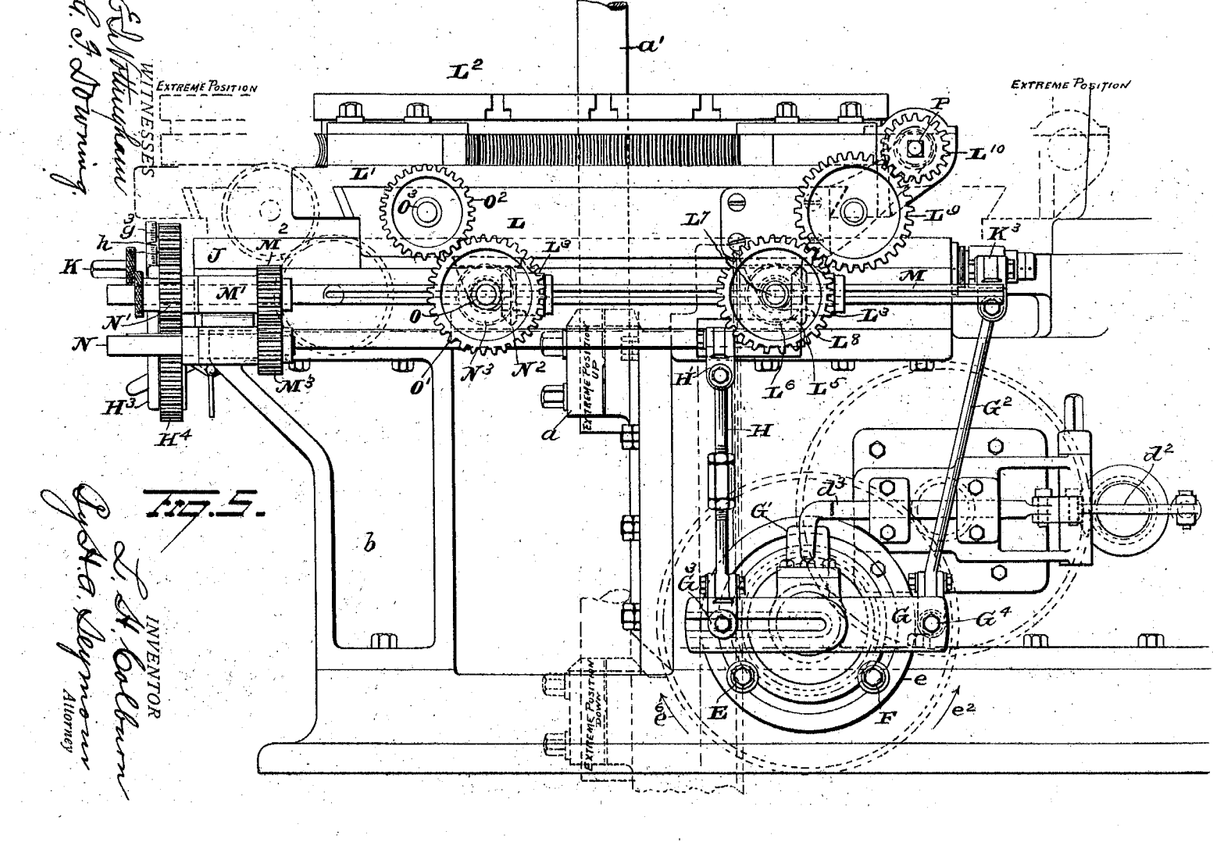
Fig. 5 is an enlarged view, in side elevation, of the main frame, showing the tables, the stroke-regulating disk, rocker-arm, and devices connecting the latter with with the table-actuating devices.

The operation of the parts thus far described is as follows: When the cutter-bar $a'$, which is clamped securely at its lower end to the ram $a$, is on its downward stroke, the stroke-regulating disk $e$ (see Fig. 5) will be moving in the direction of the arrow $e^2$. When the cutter $a^2$, which is secured to the cutter-bar $a'$, reaches the end of its downstroke, the tappet F, carried by disk $e$, comes in contact with the lug G' on the rocker-arm G and moves it a certain distance (which is regulated by the width of the lug) before it comes in contact with the shipper-rod $d^3$. This rocking movement of the arm G accomplishes two functions: First, it moves the lever-arm $K^3$, and this rotates the sleeve $K^2$, and as the thread on the sleeve $K^2$ is a right-hand thread the rotation of the sleeve $K^2$ within the nut K' necessarily moves the feed-screw K in the direction of the arrow $K^4$, and as the screw K is connected to the table L by the nut L' it follows that table L and all parts (including the work) thereon move in the same direction. This movement is slight and probably not more than one-sixteenth of an inch, but it is sufficient to give clearance to the cutter on its up or return stroke; second, this same movement of rocker-arm G also moves disk-plate $H^3$ the requisite number of notches of gear $H^4$ to give the feed desired. This distance is determined by the position of the stud $G^3$, which secures rod H to the rocking arm G in the slot $G^5$ in said arm. In practice it is usually from one to six notches. The actual feeding, however, does not take place at this time, but the pawl merely moves backward the right distance ready to take the feed when the cutter reaches the top of the stroke on the return motion. After the tappet F comes in contact with the lug G' on the rocker-arm G it continues to move it until it comes in contact with the shipper-rod $d^3$, at which time the shipping mechanism operates as before explained and the direction of rotation of the parts is reversed. This reversal of direction of motion of the parts also reverses the direction of movement of the disk $e$, which now rotates in the direction of arrow $e^6$ until the tappet E comes in contact with the lug G'. This reverses the direction of movement of the rocker-arm G, and this movement causes the table L and the parts thereon to be fed the requisite amount by means of the mechanism described. This reverse movement of rocker-arm G is also communicated to the lever-arm $K^3$ through rod $G^2$, thus imparting a rotary movement to the sleeve $K^2$, which forces the shaft K longitudinally in the direction indicated by arrow $J^4$ and brings the work into proper position under the cutter $a^2$.

As the screw carries with it all the tables and work thereon, it will be seen that the longitudinal movement of the feed-screw gives an automatic relief to the cutter on its return stroke and takes up the same amount on the feeding or down stroke, the feed being simply added to the clearance at each stroke irrespective of the length of stroke the machine may be taking. The ball thrust-bearings at each end of the sleeve $K^2$ are introduced for the purpose of reducing friction, and in practice it has been found to so reduce it that the movement of lever-arm $K^3$ and the sleeve $K^2$ do not affect the feed-screw in the slightest so far as tending to revolve same is concerned. It merely imparts a longitudinal movement, the amount of which depends upon the pitch of the threads on sleeve $K^2$ and the travel of the arm $K^3$.

The tappets E and F perform three important functions—to wit, they regulate the stroke of the machine; second, give an automatic relief to the cutter on its return stroke, and, third, provide a variable feed, which operates all the tables of the machine.

Motion, as before explained, is imparted to the main table L by shaft $H^2$, feed-screw K, and the intermediate gearing described. Mounted on the main table L is the transverse table L', and seated on the latter is the rotary table $L^2$. From this arrangement of parts it is evident that as the main table L is fed longitudinally in the direction of the feed-screw the tables L' and $L^2$, carried thereon, are also moved therewith. The feed-table L' is designed to move transversely or at right angles to the feed-screw and the upper table $L^2$ is mounted to rotate on table L', and the necessary motions are imparted to these tables through the following mechanism:

Mounted in a bracket M', attached to the table-slide J, is the shaft M, this shaft being supported at intervals throughout its length by bearings $L^3$, carried by table L. Rigidly keyed to shaft M immediately behind or in rear of the bracket M' is the pinion M², and removably mounted on said shaft M in advance of the bracket M' is the pinion N'. This pinion N' is keyed to shaft M so as to rotate therewith, and is removably mounted thereon, so as to be readily disengaged therefrom, and placed on the stub-shaft N, also mounted in the bracket M'. The pinion N' is removably held in position on shafts M and N, preferably by a spring-catch of any desired construction, and when on either shaft it meshes with the gear H⁴ on driving-shaft H². Secured on the rear end of stub-shaft N is the pinion M³, which meshes with pinion M² on shaft M. Hence it will be seen that when the pinion N' is on shaft M motion will be imparted to same in one direction, and by removing pinion N' from shaft M and placing it on stub-shaft N a reverse movement will be imparted to shaft M through the gears M³ and M². The shaft H² has a rocking movement imparted to it by the lever G; but the disk-gear H⁴, which is mounted thereon, is moved in one direction only by the pawl-and-ratchet arrangement shown. By the introduction, however, of the stub-shaft N, removable gear N', and gears M² and M³ the direction of rotation of shaft M imparted to it from shaft H² can be varied at pleasure, thus giving transverse and rotary feeds in both directions.

Shaft M passes through and is supported by bevel-gears carried by brackets L³, depending from the table L. Bevel-gear N² is carried by one of the brackets L³ and is slidingly keyed to shaft M, so as to rotate therewith, and meshes with a bevel-gear N³, fast on a stub-shaft O, carried by the table L. Secured on the outer end of the shaft O is the spur-gear O', which meshes with the gear-wheel O² on the end of screw-shaft O³. This screw-shaft is carried in the slide for the transverse table L' and engages nut L⁴, carried by said table. Hence it follows that when the screw O³ is rotated the transverse table L' is shifted in a lateral direction on the table L.

The rear end of the table L carries a similar bracket L³, in which is mounted a bevel-gear L⁵, which has a sliding connection with shaft M. This gear L⁵ meshes with a similar gear L⁶, fast on stub-shaft L⁷, and the latter carries at its outer end the pinion L⁸, which meshes with pinion L⁹, carried by main table L. This pinion L⁹ meshes in turn with pinion L¹⁰ on shaft P, mounted on the table L', which shaft carries a worm keyed thereto, so as to turn therewith, but mounted in a bracket carried by the table L', so as to slide transversely with the latter. This worm engages the worm-teeth on the upper table L² and operates to rotate the latter.

The cutter-bar a' is, as clearly shown in the drawings, made integral throughout its length and is provided at a point between its ends with a slot for the introduction of the cutter, which may be secured in place by any approved means. The lower end of this cutter-bar is firmly clamped to the ram a, through which motion is applied thereto, as previously explained, and it is supported against lateral or deflecting strains at a point adjacent and behind the cutter by the shoe a³, carried by a cross-bar secured to the table-slide J, while the upper end of the cutter-bar is mounted in and supported by the arm Q, carried by the column Q². The arm Q is carried on a sleeve Q', which has a sliding fit on the column Q² and is kept in alinement by a rack Q³, (on the column,) which serves as a key or feather. This sleeve or a collar below the sleeve carries a shaft having a pinion meshing with the rack Q³. Hence by rotating this shaft the arm Q can be raised or lowered as the necessities of the work demand, and by providing the parts with a pawl and ratchet the arm may be caused to remain in any desired position to which it may be adjusted. This arm Q is free to revolve on the sleeve, but may be locked thereon by the screw-pin Q⁴, so that the front bearings R or R' thereon will be in perfect alinement with the cutter-bar a' and afford a firm and solid bearing for the upper end thereof. The arm Q is made with two half-bearings, as shown, and each half-bearing is provided with a swinging cap or half-bearing, which when closed and locked by the locking-screws form firm and solid supports for the upper end of the cutter-bar.

With some work—as, for instance, a fly-wheel—it is impossible to locate it under the cutting-tool with its rim inside the column Q², and in such cases the column which is adjustable toward and from the cutter-bar, should be slid inwardly and secured with the inner bearing R' in line with the cutter, so as to bring the column Q² within the rim of the pulley. This column may also be adjusted laterally or circumferentially on the base to accommodate work of various sizes and shapes. By means of the bearings R and R' having swinging caps it will be seen that the cutter-bar can be disengaged from its upper bearing and the latter swung out of the way for the removal of work by simply releasing the swinging cap of the bearing carrying the upper end of the bar and then swinging the arm Q on its sleeve away from the cutter-bar.

Figure 3:
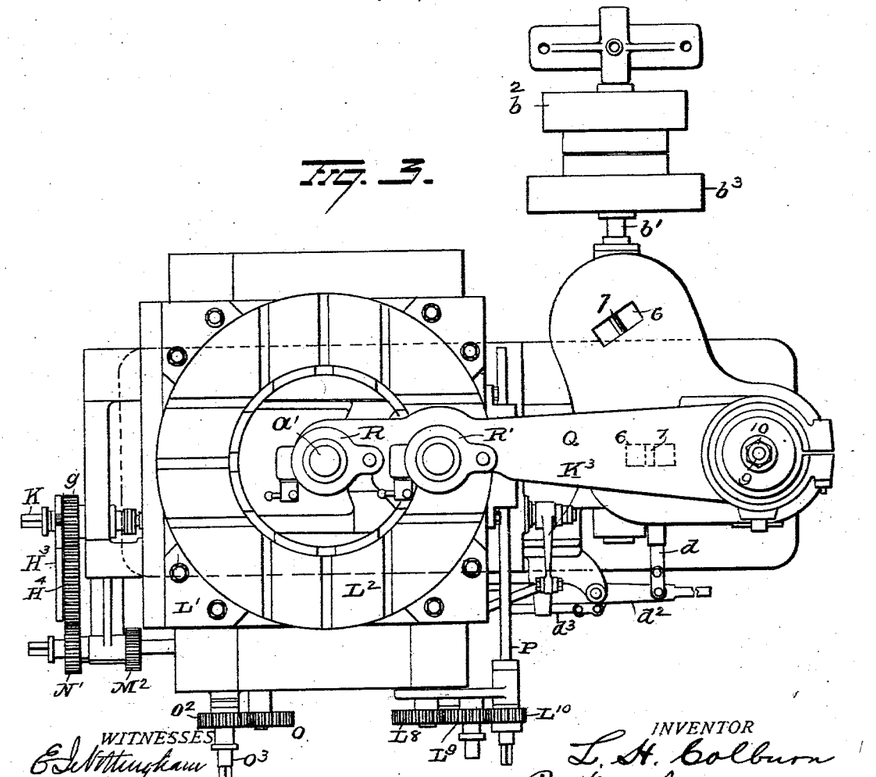
Fig. 3 is a plan view, of same.

The base b of the machine is provided at intervals on its upper face with the slots 6, having cross-bars 7, (see Fig. 3,) which latter are designed to be engaged by the hooked end 8 of rod 9, (see Fig. 4,) which latter projects upwardly through the column Q² and is engaged at its upper end by the nut 10, which latter operates to lock the parts in place. By loosening the nut the rod 9 can be disengaged from the cross-bar 7 and the column Q² adjusted and secured in another position.

One great disadvantage of the ordinary slotting-machine is the fact that the power is applied from above and the cutting-tool being supported at one end only has a tendency to spring away from the work. With my improvements all the driving mechanism is below and the cutter, which is supported above and below and substantially in a plane with the work, works with a draw cut, which is the rational way to take heavy planing cuts. The cutter-bar being in a single piece and having three bearings is perfectly supported throughout its length, and heavy cuts can be taken without the slightest danger of springing the bar. This cutter-bar, while I have shown it round, may be square or rectangular, and for some work—such as slotting crank-shafts, connecting-rods, locomotive driving-boxes, straps, cross-heads, &c.—I prefer to use a rectangular cutter-bar. For key-seating and similar work round bars are preferable. Again, the automatic relief motion to the table carrying the work greatly lengthens the life of the cutters. It never requires any adjustment or alteration when the stroke is changed, and it works equally well on long as on short strokes.

It is evident that many slight changes might be resorted to in the relative arrangement of parts herein shown and described without departing from the spirit and scope of my invention. Hence I would have it understood that I do not wish to confine myself to the exact construction and arrangement of parts shown and described; but, Having fully described my invention, what I claim as new, and desire to secure by Letters Patent, is—

1. The combination with a cutter-bar, driving mechanism and a table, of a screw for feeding the table, a disk or carrier, tappets on said disk or carrier, a rocking arm adjacent to said disk or carrier and adapted to be engaged by said tappets, means for transmitting motion alternately in opposite directions from said driving mechanism to said disk or carrier, and devices between said rocking arm and screw for moving the feed-screw longitudinally first in one direction and afterward in the reverse direction.

2. The combination with a cutter-bar, driving mechanism connected therewith and a table, of a feed-screw for the table, a disk or carrier, devices connecting said disk or carrier with the driving mechanism, tappets on said disk or carrier, a rocking arm adjacent to the disk or carrier and adapted to be engaged by the tappets, devices between the rocking arm and feed-screw for moving the latter longitudinally, reversing means for the driving mechanism and disk or carrier and devices actuated by the rocking arm for controlling said reversing means.

3. The combination with a cutter-bar and driving mechanism, of a disk connected with the driving mechanism, tappets carried by said disk, a rocking arm adjacent to said disk, a lug on said rocking arm arranged to be operated by said tappets, reversing devices for the driving mechanism arranged to be operated by the rocking arm, a table, a feed device for the table and means connected with and operated by the rocking arm for moving said feed device longitudinally to move the table relatively to the cutter-bar at each end of the stroke thereof.

4. In a slotting-machine, the combination with driving mechanism, a cutter-bar, a cutter, a table, and means for feeding the table toward the cutter, of a rocking arm connected with the table-feeding means, tappets automatically actuated by the driving mechanism of the machine, a lug projecting from said rocking arm in position to be engaged alternately by said tappets for controlling the movements of the rocking arm to move the table with the work thereon away from the cutter prior to the return stroke of the latter, and to move the said table and work back to its position within reach of the cutting-tool prior to the cutting stroke.

5. The combination with a cutter-bar, driving mechanism therefor, and a table, of a rocking arm, feed mechanism for the table connected with said rocking arm, reversing mechanism for the driving-gearing, a movable disk or carrier and tappets on said disk or carrier for actuating the rocking arm to operate the table-feed mechanism and for operating the reversing mechanism.

6. The combination with a cutter-bar, driving mechanism, reversing means for the driving mechanism, a table, means for feeding the table and means for imparting a lateral motion to the table independent of the feed thereof, at each end of the stroke of the cutter, of a rocking arm connected with both of said means, tappets and a carrier for said tappets actuated by the driving mechanism for causing said tappets to actuate the rocking arm and reversing mechanism.

7. The combination with a cutter-bar, a table, a driving-shaft, oppositely-driven clutch-pulleys, and gearing connecting the driving-shaft and cutter-bar whereby the latter is actuated, of a disk operated by the driving-shaft, tappets adjustably secured to said disk, a rocking arm to be actuated by said tappets, shifting devices connected with the clutches and adapted to be actuated by the tappets whereby the clutches are shifted by the tappets, a weight on said shifting devices, adapted by its momentum to assist in imparting full stroke to the shifting devices, and means for moving the table, said means actuated by the rocking arm.

8. The combination with a cutter-bar and suitable driving-gear, of a disk carrying tappets and connected with said driving-gear, means actuated by said tappets for reversing the direction of motion of the driving-gear, a rocking arm actuated by the tappets on the disk, a feed-table and means actuated by said rocking arm for feeding the table.

9. The combination with a cutter-bar and a feed-table, of a rocking arm, means coöp- erating therewith for intermittently feeding the table and work thereon to the cutter-bar, automatic means also coöperating with said rocking arm for shifting the table and its work away from the cutter-bar as the latter makes its return stroke, driving means for the cutter-bar, reversing devices for said driving means, and means actuated by the driving means for automatically operating said rocking arm and reversing devices.

10. The combination with a cutter-bar, driving mechanism for the cutter-bar, and feed-table, of a stroke-regulating disk having tappets, a rocking arm actuated by said tappets, table-feeding devices connected at one end of said rocking arm, means actuated by the other end of said arm for moving the table and work thereon away from the cutter prior to the return stroke of the latter, and reversing devices for the driving mechanism actuated by the tappets on the stroke-regulating disk.

11. The combination with a cutter-bar, driving mechanism for the cutter-bar, and a feed-table, of a stroke-regulating disk, tappets adjustably secured thereto, a rocker-arm having a projection adapted to be engaged by said tappets, a feed-screw, mechanism actuated by said rocker-arm for rotating the feed-screw, and mechanism also actuated by said arm for moving the feed-screw and table connected thereto longitudinally, and reversing mechanism for the driving mechanism actuated by the adjustable tappets on the stroke-regulating disk.

12. The combination with a cutter-bar, a feed-table, a feed-screw connected to the table and means for rotating the feed-screw, of a nut carried by the table slide or support, a threaded sleeve within said nut and loosely embracing the screw-shaft, means for restraining said sleeve against endwise movement on the shaft and means for rotating the sleeve whereby the latter is moved longitudinally within the nut.

13. The combination with a cutter-bar, a feed-table, a feed-screw and means for rotating the latter, of a split nut carried by the table slide or support, collars embracing the ends of said split nut, a threaded sleeve within the nut and loosely embracing the screw, antifrictional thrust-bearings for restraining endwise movement of the sleeve on the screw, a rocking arm, a connection between said rocking arm and sleeve, and means for rocking the rocking arm whereby the sleeve and the screw are moved longitudinally within the nut.

14. The combination with a cutter-bar, a feed-table, and a feed-screw, of driving-gearing, means for reversing the direction of motion of said gearing, means connecting said gearing and feed-screw whereby the latter is rotated, means for moving the feed-screw longitudinally independently of its rotary motion, a rocking arm controlling the operation of said feeding and moving means, tappets, a carrier therefor and connections between said carrier and driving mechanism for causing the tappets to operate the rocking arm and reversing means.

15. The combination with a cutter-bar, driving mechanism, feed-table and feed-screw, of a rocking arm connected at one end to mechanism which operates to rotate the feed-screw and at its other end to mechanism which operates to move said feed-screw longitudinally independently of its rotary motion, a disk connected with the driving mechanism and carrying tappets for operating said rocking arm and reversing mechanism also operated by said tappets.

16. The combination with a cutter-bar, a feed-table and a feed-screw, of driving-gearing connected with the cutter-bar, a stroke-regulating disk actuated by said gearing and provided with adjustable tappets, reversing mechanism for the gearing actuated by said tappets, a rocking arm also actuated by said tappets, means connected to one end of said arm for rotating the feed-screw and means actuated by the other end of said arm for shifting the feed-screw longitudinally.

17. The combination with a main table, a transverse table on the main table, and a rotary table on the transverse table, of a rocking arm, devices for operating the tables, devices controlled by said rocking arm for imparting the necessary motions to the table-operating devices, and also for shifting the main table away from the cutter-bar while the latter is making its return stroke, and means for actuating said rocking arm.

18. The combination with a frame or base, an adjustable column thereon and an arm pivotally mounted on said column, a plurality of bearings at the outer end of said arm for the cutter-bar and means for locking said arm to the column, of a cutter-bar supported at its upper end in any of said bearings at the outer end of the arm, means secured to the lower end of said bar for actuating the same, and a bearing supporting said bar adjacent to the table.

19. The combination with a frame or base, a column adjustably secured thereon and carrying a vertically-adjustable sleeve, an arm pivotally mounted on said sleeve, and provided near its free end with a plurality of half-bearings, means for locking said arm to the column and a swinging cap for each half-bearing, of an integral cutter-bar supported at its upper end in one of the bearings in said arm, a ram secured to the lower end of said bar, and a bearing or support for said cutter-bar intermediate the ram and the upper bearing.

20. The combination with a frame or base, a column adjustably secured thereon and provided with a rack-bar, a sleeve on said column carrying a pinion engaging the rack, and an arm pivotally mounted to turn on said sleeve, means for locking said arm in position and a plurality of bearings at the outer end of said arm, of a cutter-bar consisting of a single bar of metal mounted at its upper end in one of the bearings in said arm, a ram connected to the lower end of said bar, means for imparting movement to said ram, and a bearing supporting the cutter-bar at a point intermediate the ram and upper bearing.

21. The combination with a main feed-table, a transverse table and a rotary table and a feed-screw for each table, of a rocking shaft for transmitting motion to all of said screws, and reversing mechanism interposed between the rocking shaft and the feed-screws of the transverse and rotary tables whereby said tables may be automatically moved in either direction.

22. In a slotting-machine, the combination with a cutter-bar, a main table and a feed-screw therefor, of a rocking shaft and gearing for imparting a rotary movement from the latter to said screw, and means independent of said rocking shaft for imparting longitudinal movement to the screw and table connected thereto, and mechanism for driving said cutter-bar and the feeding mechanism.

23. In a slotting-machine, the combination with a cutter-bar, a main table, a feed-screw therefor and a rocking shaft, gearing for imparting rotary movement to said feed-screw and a rocking arm for actuating said rocking shaft, of devices independent of the rocking shaft connected to and actuated by the device which actuates the rocking shaft for shifting the feed-screw and table connected thereto longitudinally and mechanism for driving said cutter-bar and rocking arm.

24. In a slotting-machine, the combination with a main table, feed-screw therefor, a rocking shaft and gearing for imparting a rotary motion to said feed-screw and a rocking arm connected with the rocking shaft for actuating it, a cutter and means for actuating same, of devices independent of the rocking shaft connected to and actuated by the device which actuates the rocking shaft for shifting the feed screw and table longitudinally with each stroke of the cutter, and mechanism cooperating with the actuating means of the cutter for operating the rocking arm.

In testimony whereof I have signed this specification in the presence of two subscribing witnesses.

LESLIE H. COLBURN.

Witnesses:
H. W. BRECKENRIDGE,
W. E. BARROW.